July 4, 1967   F. K. H. NALLINGER   3,329,936
STOP LIGHT CONTROL FOR VEHICLES WITH TWO-CYCLE ENGINES
Filed April 1, 1963
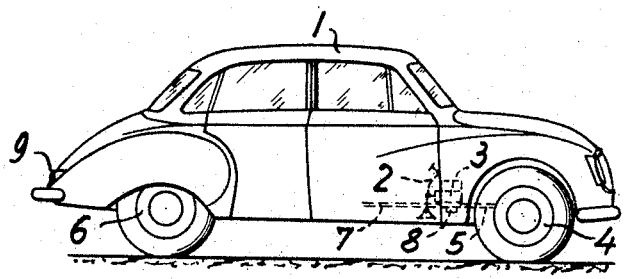
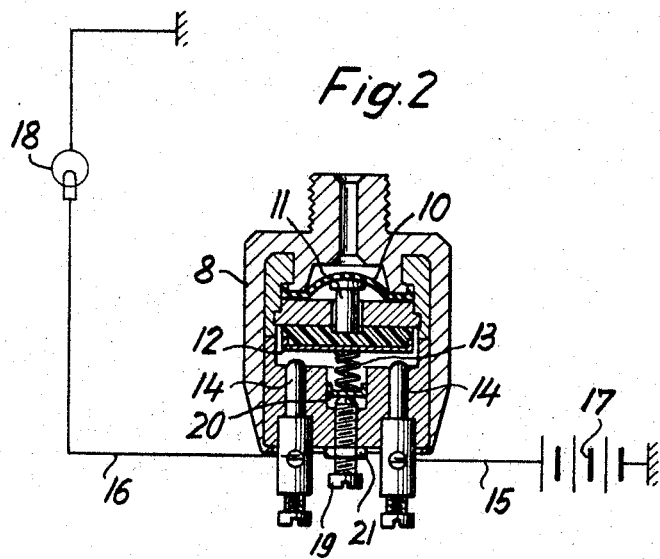
INVENTOR
Friedrich K. H. Nallinger
BY Dicke & Craig
ATTORNEYS

3,329,936
STOP LIGHT CONTROL FOR VEHICLES WITH TWO-CYCLE ENGINES
Friedrich K. H. Nallinger, Stuttgart, Germany, assignor to Daimler-Benz Aktiengesellschaft, Stuttgart-Unterturkheim, Germany
Filed Apr. 1, 1963, Ser. No. 269,549
Claims priority, application Germany, Apr. 7, 1962, D 38,608
2 Claims. (Cl. 340—71)

The present invention relates to improvements in motor vehicles, and more particularly in a vehicle which is driven by a two-cycle engine and is equipped with stop lights which are controlled by the operation of a switch when the brakes of the vehicle are actuated.

It is a well-known fact that two-cycle engines have a much lower braking effect than four-cycle engines. The driver of a car with a two-cycle engine must therefore actuate his normal brakes already at a time when the driver of a car with a four-cycle engine can still brake his car sufficiently by shutting off the gas supply to throttle the engine and by using the engine as a brake. This may be frequently noticed in traffic, and especially when cars have to drive in a convoy. However, since the drivers riding behind a car with a two-cycle engine often do not know or realize what type of car this is and wonder why the stop lights of this car light up, they will—to be on the safe side—as a rule also apply their own brakes, even though with their four-cycle engines there is as yet actually no need for doing so. The result of this is very often an undesired slowing-down of the whole line of traffic which, in turn, may lead to accidents if one or another driver does not pay proper attention to his driving and does not notice the flashing of the stop lights of the car in front of him.

It is an object of the present invention to overcome these dangers and disadvantages and for doing so to design the stop light switch of a motor vehicle with a two-cycle engine in such a manner that the stop lights of such a vehicle will not light up when the brakes are only lightly applied.

In a vehicle with hydraulic brakes and a switch which is responsive to the hydraulic pressure for controlling the stop lights, that is, especially a diaphragm switch, the present invention may be applied by providing a switch with a spring of such an initial tension that the stop lights will not light up except when a higher hydraulic pressure is applied. The initial tension of this spring should be made of such a strength that the sum of the braking effect of the brakes of the vehicle which corresponds to this initial spring tension and of the braking effect of the two-cycle engine is equal to the braking effect which is alone produced by a four-cycle engine.

The initial tension of this spring is preferably adjustable from the outside of the stop light switch and may, if desired, be eliminated entirely so as to permit it to be adjusted in accordance with the particular type of vehicle and engine to which the spring is applied or to eliminate its effect entirely if this should be required by law.

The features and advantages of the present invention will become more clearly apparent from the following detailed description thereof which is to be read with reference to the accompanying drawings, in which:

FIGURE 1 shows a side view of a car with a two-cycle engine and a stop-light control according to the invention; while FIGURE 2 shows a cross section of a hydraulic brake control switch as applied in the car according to FIGURE 1.

The car 1 as illustrated in FIGURE 1 is assumed to be driven by a two-cycle engine, not shown, and it is further equipped with an oil-hydraulic brake mechanism which essentially consists of a brake master cylinder 3 which may be actuated by a brake pedal 2, of a brake-pressure line 5 leading from the master cylinder 3 to the brake cylinders, not shown, on the front wheels 4 and the corresponding line 7 leading to the brake cylinders, not shown, on the rear wheels 6. The master cylinder 3 has a hydraulic control switch 8 connected thereto which is provided for controlling the operation of the stop lights 9 on the rear end of the car. This control switch 8 is designed so as not to become effective until the hydraulic pressure in the master cylinder 3 exceeds a certain value.

As illustrated in detail in FIGURE 2, the control switch 8 is provided in the form of a diaphragm switch which consists of a housing containing a diaphragm 10 which under the pressure in the master cylinder 3 acts upon a pin 11 to move a contact plate 12 against the action of a spring 13 into engagement with a pair of contact pins 14 so as to connect the two conductors 15 and 16 which lead to the battery 17 and to the light bulb 18 of the stop lights, respectively, to each other so that the stop lights will then light up. In order to prevent the contact plate 12 from engaging with the two contact pins 14 and the stop lights from lighting up already at a time when the movements of the car are merely controlled by short and light operations of the brakes as required in vehicles with two-cycle engines, spring 13 is provided with such an initial tension that for compressing this spring and for lighting up the stop lights the oil pressure in the master cylinder and acting upon the diaphragm 10 must first be increased to a strength greater than that which is required for the mentioned light operations of the brakes. The initial tension of spring 13 may be accordingly adjusted from the outside of switch 8 by means of a setscrew 19 which acts upon the spring through a guide plate 20 and may be locked in the adjusted position by a nut 21.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In a motor vehicle having a two-cycle engine, hydraulically actuated brakes and stop lights: brake control means for selectively delivering hydraulic fluid to said brakes under varying pressures ranging from a relatively low pressure corresponding to light braking for minor control of the vehicle to a relatively high pressure corresponding to emergency braking for sudden stopping; switch means responsive to said brake control means for actuating said stop lights, when said control means delivers hydraulic fluid at a predetermined pressure substantially greater than said relatively low pressure; said switch means comprising a housing having a chamber therein, a diaphragm means mounted in said housing so as to be movable within said chamber, movable contact means mounted on one side of said diaphragm, means for establishing fluid communication between the other side of said diaphragm and said brake control means, stationary contact means normally spaced from said movable contact means and connected in series with said stop lights and a source of electric power, said diaphragm means having a resilience sufficient to maintain the spaced relationship between said movable contact means and said stationary contact means when subjected to hydraulic pressures lower than said predetermined hydraulic pressure and to allow said movable contact means to contact said stationary contact means when said hydraulic pressure is between said predetermined hydraulic pressure and said relatively high pressure, whereby the total braking of the vehicle, including the braking effect of the two-cycle engine and the degree of braking corresponding to said predetermined hydraulic pressure, will substantially equal the braking effect of a four-cycle engine in a similar vehicle and the stop lights will only be lit at and above said predetermined hydraulic pressure.

2. The device of claim 1, wherein there is provided means for adjusting the resiliency of said diaphragm means from the outside of said housing.

References Cited

UNITED STATES PATENTS

| 1,946,759 | 2/1934 | Preston et al. | 340—71 |
| 2,946,042 | 7/1960 | Beasley | 340—69 |
| 3,093,716 | 6/1963 | Horowitz | 200—83 |

NEIL C. READ, *Primary Examiner.*

A. H. WARING, *Assistant Examiner.*